(12) United States Patent
Brun

(10) Patent No.: US 7,478,858 B1
(45) Date of Patent: Jan. 20, 2009

(54) PET TRAVELER ASSEMBLY

(76) Inventor: Richard Brun, 27662 Aliso Creek Rd. #3215, Aliso Viejo, CA (US) 92656

( * ) Notice: Subject to any disclaimer, the term of this patent is extended or adjusted under 35 U.S.C. 154(b) by 108 days.

(21) Appl. No.: 11/638,051

(22) Filed: Dec. 12, 2006

(51) Int. Cl.
*B60R 13/01* (2006.01)

(52) U.S. Cl. .................... 296/39.1; 296/24.31

(58) Field of Classification Search ............... 296/39.1, 296/24.31
See application file for complete search history.

(56) References Cited

U.S. PATENT DOCUMENTS

| | | | |
|---|---|---|---|
| 4,803,951 A | 2/1989 | Davis | |
| 5,265,558 A | 11/1993 | Schönrock | |
| 5,806,909 A * | 9/1998 | Wise | 296/39.1 |
| 6,012,753 A | 1/2000 | Ordoyne et al. | |
| 6,851,385 B1 | 2/2005 | Poss et al. | |
| 6,907,842 B2 | 6/2005 | Godshaw | |
| 6,966,275 B2 | 11/2005 | Whitehill | |
| 2004/0182329 A1 | 9/2004 | Kroculick | |
| 2004/0231604 A1 | 11/2004 | Badler | |
| 2005/0211175 A1 | 9/2005 | Johnson | |
| 2006/0118051 A1 | 6/2006 | Lima | |

* cited by examiner

*Primary Examiner*—Joseph D Pape
(74) *Attorney, Agent, or Firm*—Edgar W. Averill, Jr.; Kenneth L. Green

(57) ABSTRACT

An animal traveler/animal comfort assembly is provided for use in a passenger vehicle. The assembly generally includes a compressible base having a front side, a substantially opposing rear side, a left side and a right side located between the front side and rear side. The base is conveniently sized to fit within and closely conform to a cargo space, or other interior space, of a vehicle, for example, a sport utility vehicle. The base may include a lower layer of support foam and an upper layer of memory foam, the layers being encased by a substantially puncture resistant covering. Upstanding front and rear panels are connected to the front side and rear side of the base. The front and rear panels may be hingedly connected to the base to facilitate ingress and egress of the animal. The assembly further includes opposing, upstanding side panels which may be removably connected to the left side and right side of the base.

9 Claims, 3 Drawing Sheets

PET TRAVELER ASSEMBLY

BACKGROUND

The present invention generally relates to pet products and more specifically relates to an animal traveler assembly for facilitating safe and comfortable travel with pets or other animals in a passenger vehicle.

Dogs in particular seem to truly enjoy travel in an automobile with their owners. However, allowing a dog to roam freely during a ride can be hazardous, for obvious reasons. There have been numerous attempts to provide convenient and safe devices for facilitating transport of pets, for example, dogs. Many of such devices are directed at either containing the animal in a sectioned-off portion of a vehicle or restraining the animal by means of tethers or carrier crates.

Dogs are commonly transported in a passenger vehicle by means of an enclosed carrier crate sized to contain the dog but not large enough to allow great freedom of movement. Such crates are commercially available and are generally not specifically designed for vehicle transport of the pet. For example, while being somewhat effective to temporarily contain a dog during car travel, such crates can shift or even tip during transport, thereby causing fright or injury to the animal inside the crate. In the event of a vehicle accident, the crate may be difficult to access or extract from the vehicle and the animal may become trapped therein.

A divider or partition provides an alternative means of containing or restricting movement of a dog during travel. Commercially available dividers facilitate travel with dogs by restricting the animal's range of movement to a rear passenger compartment or an interior cargo space of a vehicle. Ordoyne et al., U.S. Pat. No. 6,012,753 discloses a portable pet barrier which is positioned in the vehicle in place of seat headrests. The Ordoyne et al. barrier is used to prevent a dog from passing forward of the divider. These devices are useful but do not address many problems associated with travel with a pet, for example, pet comfort. In addition, many such devices often become a somewhat permanent fixture in the vehicle in that SUV owners often find that these devices tend to be cumbersome to remove from the vehicle once installed. In addition, even with such a barrier installed, the cargo portion of an SUV is not designed to hold a moving dog. The ordinary motions of a moving vehicle can cause a dog, particularly a larger or older dog, located in the cargo space, to lose footing, fall and become injured.

Sharp movements experienced by a dog riding in a vehicle can result in more than mild discomfort to the dog. For example, canine hip dysplasia, a common, degenerative and painful condition which primarily affects larger or older dogs, can become aggravated and can cause severe pain to an animal subjected to a rough ride. When a dog has hip dysplasia, the head of the femur does not fit properly into the hip socket, and the joint becomes malformed and unstable. In advanced cases of the disease, the joint capsule and the ligament between the two bones become excessively stretched, adding further instability to the joint. Although moderate exercise that strengthens the gluteal muscles, such as running and swimming, is believed to be helpful for dogs with this condition, sharp, unnatural movements such as those experienced by a dog riding in a moving vehicle, can apply too much force to the joint, and are contraindicated.

More effective, safer, easier to use devices are needed for facilitating comfortable travel with animals, such as dogs and other pets, in passenger vehicles.

SUMMARY OF THE INVENTION

Accordingly, an animal traveler assembly/animal comfort assembly is provided which is advantageously designed to address many of the problems associated with transporting or traveling with animals, for example, companion animals, for example, dogs, in a passenger vehicle, such as an SUV, passenger van, automobile and the like. Although the present description of the invention is directed to embodiments of the invention especially designed for accommodating dogs, it is to be appreciated that the present invention can be used for accommodating other animals as well as dogs.

In a broad aspect of the invention, the present assembly is structured to substantially conform to interior surfaces of a vehicle which form an interior section, for example, an interior cargo space, of a passenger vehicle. More particularly, the assembly may be structured to conform to an interior rear cargo space of a sport utility vehicle or similar passenger vehicle. In one aspect of the invention, the assembly is made of separable components which are easy to install in the cargo space, as well as easy to uninstall and remove from the cargo space as desired. In a preferred embodiment, the components of the assembly are advantageously designed to provide an inviting area of comfort and safety for pets and while traveling with their owners in a passenger vehicle.

In a specific embodiment, the assembly generally comprises a base portion, sized to substantially cover or conform to a floor region of a cargo space of a sports utility vehicle, hereinafter, usually, "SUV". The base portion may be somewhat rectangular in form. For example, the base portion may include a front side, for example, conforming in size to a width of a rear opening of an SUV, and a substantially opposing rear side. The base portion further includes a left side, for example, conforming in size to a depth of the cargo space of the SUV, and a right side, located between the front side and rear side.

Preferably, the base portion includes a first layer made of a first material and a second layer made of a second material that is different from the first material. More specifically, the first layer may comprise a compressible, pliant material forming an upper layer of the base portion. The second layer may comprise a supportive, relatively less compressive and/or relatively less pliant material forming a lower layer of the base portion. Preferably, the first material comprises a memory foam material, for example, a visco-elastic polyurethane foam material.

The assembly further comprises opposing front and rear members connected to or couplable to the front side and rear side of the base portion, respectively. More specifically, the front and rear members may be in the form of compressible panels or pads. At least one of the front and rear members may be hingedly connected to the base portion such that it is pivotal from an upright standing position to a folded or lowered position. In one embodiment, both of the front and rear panels are hingedly connected to the base portion. In another embodiment, the front panel is hingedly connected to the base portion and the rear panel is removably connected to the base portion. At least one of the front member and the rear member is preferably structured to provide a comfortable head rest surface for a dog, for example, a dog reclining on the base portion.

The assembly further comprises first and second opposing side members coupled or couplable to the left and right sides of the base portion. The first and second side members may comprise cushioned panels or pads which, when in the assembled position, are disposed in an upright position. Preferably, the first and second members are removable couplable to the base portion by means of hook and loop fastening elements, for example, Velcro tape or the like. Advantageously, the front and rear members and first and second side members are configurable to form an enclosed space, for example, a 360° barrier of a convenient height about the base portion for safe containment of an animal on the base portion. The front and rear members and first and second side members, when connected in an upstanding manner to the base portion, define surfaces which provide a soft but supportive headrest for the animal using the assembly.

Preferably, the components of the assembly, for example, each one of the base portion, front member, rear member, and left and right members, includes a cover layer which defines the outer surfaces of the assembly. Each cover layer may be in the form of a removable casing. The casing may be a strong, substantially puncture resistant material such as a synthetic fabric, for example, a polyurethane-containing material, or polyvinyl chloride-containing material, or the like.

Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description and drawings.

BRIEF DESCRIPTION OF THE DRAWINGS

The present invention may be more clearly understood, and the aspects and advantages thereof better appreciated, with reference to the following detailed description of and accompanying drawings of which.

DETAILED DESCRIPTION

Figure 1:
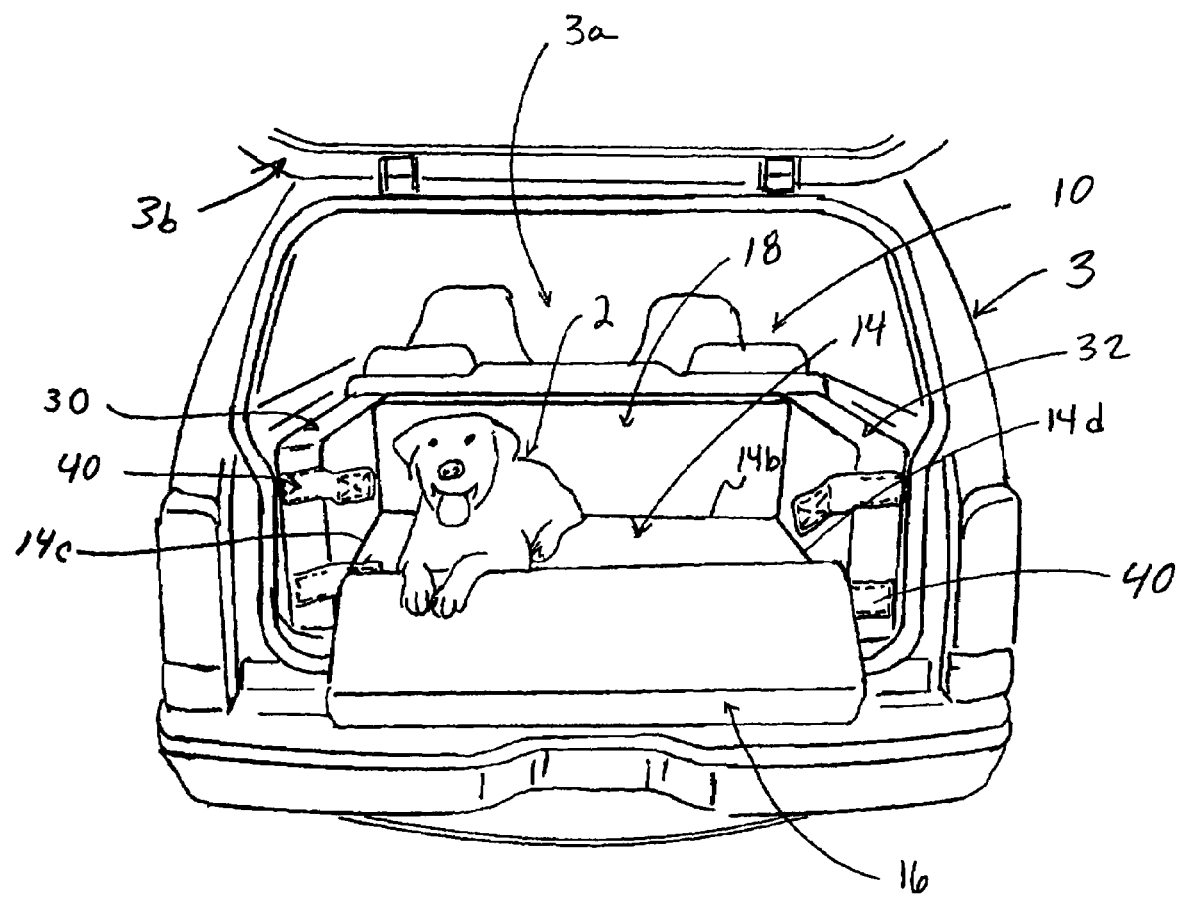
FIG. 1 is a perspective view of an animal comfort/traveler assembly in accordance with the invention, in use in the cargo space of a sports utility vehicle.

Turning now to FIG. 1, an animal traveler/animal comfort assembly, in accordance with the present invention, for facilitating safe and comfortable transport of a pet, for example a dog 2, in a passenger vehicle, for example, but not limited to, a sport utility vehicle 3, is shown generally at 10.

The assembly 10 is designed to cover the surfaces of a space, for example, an interior space, for example, an interior cargo space, of a vehicle 3, for example, a sport utility vehicle 3, or the like, with a soft, compressible surface that provides a barrier of comfort and enhanced safety for a dog or other animal, for example, during travel in the vehicle.

For example, in the embodiment shown, the assembly 10 is configured and structured to closely conform to a truck bed a pickup truck or a cargo space of or sport utility vehicle and provides a special region for accommodating a dog or other pet during travel. In addition, the assembly 10 provides a comfort barrier between a dog or other companion animal, and hard, often uneven and/or sharp surfaces which typically make up the cargo space. Further, the assembly 10 protects interior surfaces of the vehicle from damage by the dog, and functions to contain dirt, debris, fur and animal hair. The assembly 10 is easy to clean in place, and easy to remove and store when not in use.

More specifically, in the shown embodiment, the assembly 10 generally comprises a compressible base portion 14 sized to substantially cover an interior surface, for example, a floor, of an interior cargo space 3a of a sports utility vehicle. The interior cargo space, as used in this description, is generally considered to be a region of a conventional SUV, minivan, or similar type passenger vehicle, which occupies the main interior of the vehicle shared with drivers and passengers, is accessible from the rear of the vehicle, for example, by means of a hatch 3b, and is typically located behind the passenger seats of the vehicle 3. In a preferred embodiment of the invention, the base portion 14 has a length and width of at least about 30"×30" and a thickness of at least about 3" to about 4" or more. In some embodiments, the assembly is specifically sized to conform to a bed, or a portion thereof, of a light-duty or heavy duty pickup truck, or the like.

It is to be appreciated that the assembly 10, with appropriate modification thereto, can be structured to be fitted to and utilized in other interior regions of a vehicle, for example, a rear passenger seating region. Such modifications are considered to fall within the scope of the present invention.

Figure 2:
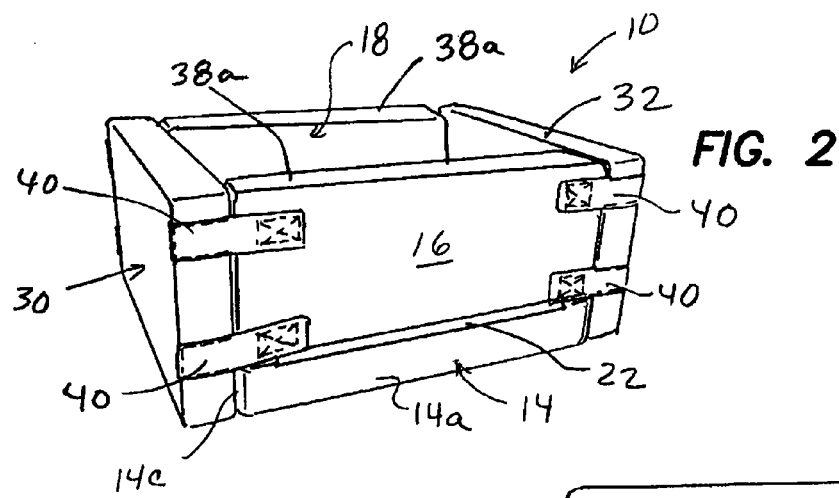
FIG. 2 is a perspective view of the assembly shown in FIG. 1 removed from the vehicle and in an assembled configuration.
Figure 3:
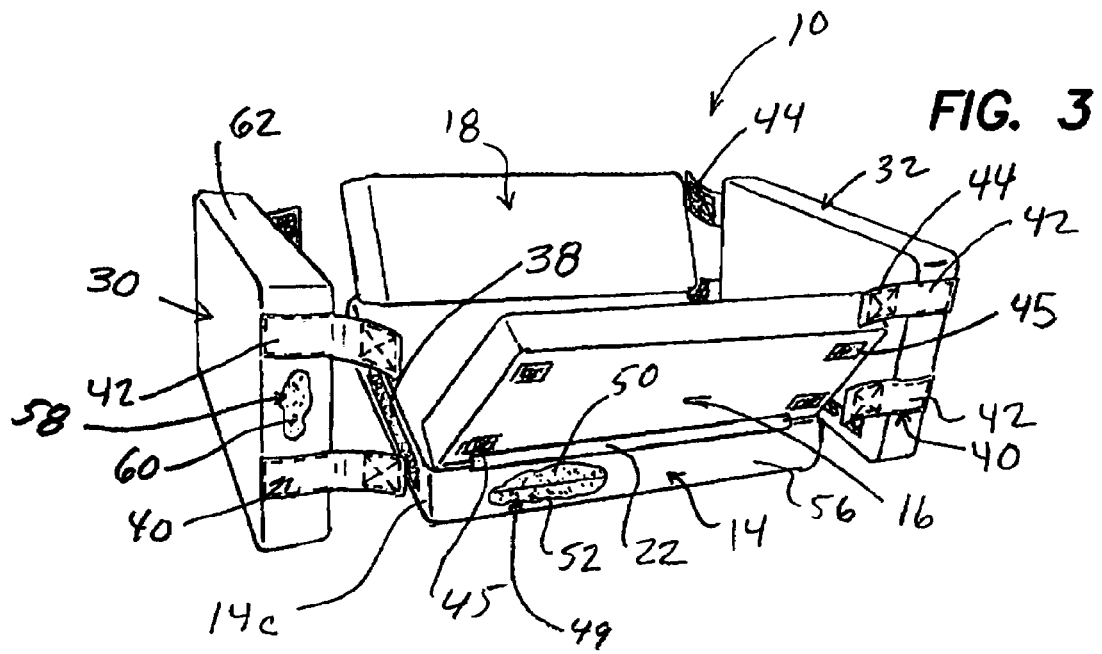
FIG. 3 is a perspective view of the assembly shown in FIG. 1 in an unassembled configuration.

Turning now as well to FIGS. 2 and 3, the base portion 14 may be generally rectangular in shape, and has a size that substantially conforms to the floor area of the interior cargo space of the vehicle. For example, the base portion 14 includes a front side 14a and a substantially opposing rear side 14b, and a left side 14c and a right side (not visible in drawings) located between the front side 14a and rear side 14b. The assembly 10 further comprises a front member 16 and a rear member 18 coupled to the front side 14a and rear side 14b respectively, a first side member 30 and a second side member 32 coupled to the left side 14c and right side of the base portion 14, respectively. Coupling between the first and second side members 30, 32 to the base portion may be provided by cooperative hook and loop fastening elements 38, for example Velcro® strips, or any other suitable fastening mechanism. At least one of the front member 16 and rear member 18 includes a head rest region 38a for accommodating the head of a dog located on the base portion.

In the embodiment shown, the front member 16 is hingedly connected by flexible portion 22 to the base portion 14, such that the front member 16 may be pivoted between an upright position such as shown in FIG. 2 for example, during travel. to a lowered position, for example for when the vehicle is parked and the vehicle hatch 3b is in an open position such as shown in FIG. 1. Similarly, referring now to FIG. 3, the rear member 18 may be hingedly connected to the rear side of the base member 14 in the same fashion as the hinged connection between front member and base portion shown and described herein.

When the front member 16 is disposed in the upright position (FIG. 2), the front member 16 is preferably removably connected to the first and second side members 30 and 32. For example, the assembly 10 further comprises a plurality of connectors, for example, flexible connectors 40 disposed on the side members 30, 32. For example, each connector 40 may include a first end 42 permanently secured to, for example, sewn to or otherwise permanently secured to, one of the side members 30 and 32, and a second end 44 removably couplable to one of the front member 16 and rear member 18, for example, by means of cooperative hook and loop fastening elements 45, buttons, snaps, ties, or any other suitable mechanism.

Figure 1A:
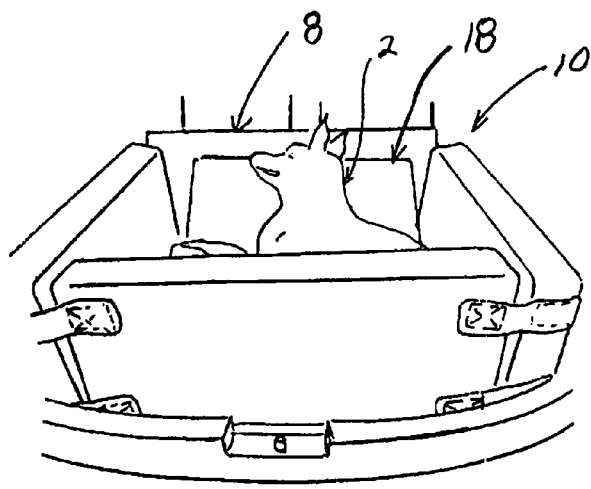
FIG. 1A is a perspective view of another assembly in accordance with the invention, in use in a cargo space of a different sports utility vehicle.

Referring briefly to FIG. 1A, the assembly 10 is shown with the rear member 18 disposed pivoted toward the front of a vehicle, thereby allowing a dog 2 to rest comfortably against the rear member 18 during travel. While in this position, the assembly 10 allows a human being, for example, a pet owner seated in the front seat, to physically reach the dog and provide comfort thereto. Advantageously, the angle of the rear member 18 with respect to the base portion 14 can be adjusted so that the rear member 18 conforms to the angle of a rear seat 8 of a vehicle.

Accordingly, during travel in a vehicle, the assembly 10 is configured as shown in FIG. 2, with front member 16, rear member 18 and side members 30, 32 disposed in a substantially upright position and circumscribing the base portion 14 so as to form a safe and contained enclosure for the pet. Advantageously, when the vehicle is parked, the assembly 10 can continue to be used to provide a special designated area for the dog or other pet. For example, by detaching the connectors 40 from engagement with the front panel 16 and dropping or pivoting the front member 14 downward such as shown in FIG. 1, the assembly provides optional open access for the pet through the rear of the vehicle.

Figure 4:
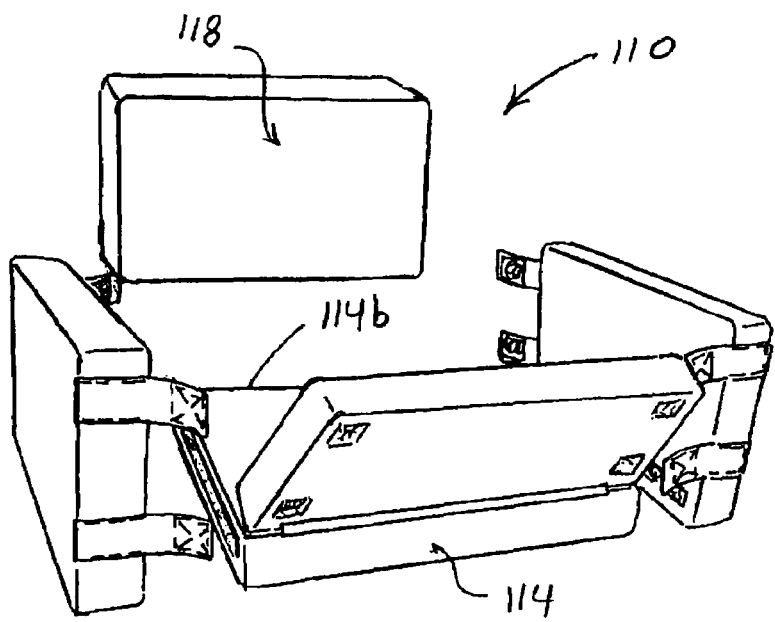
FIG. 4 is a perspective view of another embodiment of the invention.

FIG. 4 shows another assembly 110 in accordance with the invention similar to the assembly 10 shown in FIGS. 1, 2 and 3. Except as expressly described herein, assembly 110 is similar to assembly 10 and features of assembly 110 which correspond to features of assembly 10 are designated by the corresponding reference numerals increased by 100. Assembly 110 is substantially the same as assembly 10, with the primary difference being that assembly 110 comprises a rear member 118 that is removably couplable to rear side 114b of base portion 114 for example, by suitable means, such as cooperative hook and loop fastening elements, not shown.

Referring now again specifically to FIG. 3, in a preferred aspect of the invention, the base portion 14 is structured to provide enhanced safety and comfort to a pet, for example, but not limited to, a dog suffering from canine hip dysplasia. Preferably, the base portion 14 includes a core 49 comprising a first layer 50 made of a first material and a second layer 52 made of a second material that is different from the first material. In some embodiments, the second material is material that is relatively more rigid than the first material.

More specifically, at least one of the first layer and second layer comprises a compressible, pliant material, for example, a memory foam, or memory foam-containing material. For example, the first layer 50 may comprise a compressible, pliant material, such as a commercially available, memory foam material, for example, a visco-elastic polyurethane foam material, or a material having similar or comparable beneficial orthopedic properties.

In some embodiments, the second layer 52 comprises a supportive, relatively less compressive and/or relatively less pliant material, for example, a suitable support foam material. The supportive second layer 52 provides a degree of rigidity to the assembly 10. In addition, in a preferred embodiment, the supportive second layer 52 provides an effective padding between the relatively softer memory foam of the first layer 50 and the hard floor of the vehicle. The base portion 14 further includes a casing 56, for example, a removable casing or cover layer substantially enclosing the core 49.

Figure 5:
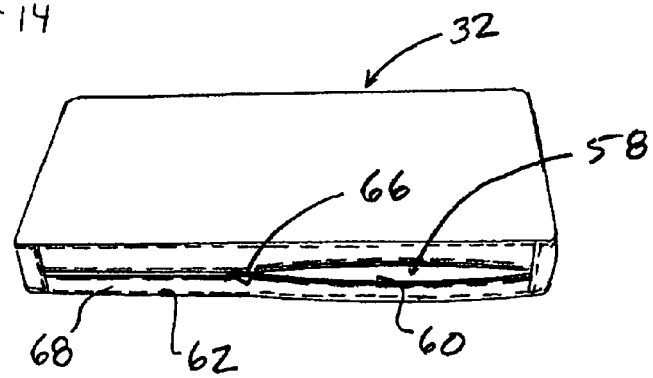
FIG. 5 is a perspective view of a side member of the assembly showing a removable casing.

Each of the front and rear members 16, 18 and left and right side members 30, 32 may comprise a core 58 made of a foam material, for example, a suitable safety support foam 60 enclosed in an outer casing 62. The foam core may be removable from said casing 62 by means of a zippered opening 66 located, for example, on a bottom panel 68 of the member, for example, such as illustrated by the side member 32 shown in FIG. 5. In some embodiments, the core 58 comprises a foam material that has a noise dampening effect, for example, a material effective to reduce highway noise inside the vehicle.

Each of casing 62 and casing 56 is preferably made of a strong, flexible and preferably puncture resistant material. The casing material is preferably a material that will resist puncturing by the toenail of a dog. Preferably, the casing material is easy to clean, for example, by wiping with a damp sponge, and propels dirt and pet dander. An especially desirable material for the casing 62 and 68 is a synthetic fabric, for example, a polyurethane-containing material, or polyvinyl chloride-containing material, or the like, for example, a material commonly referred to as "faux leather".

In specific embodiments of the invention, the dimensions of the components of the assembly when in the assembled, travel configuration shown in FIG. 2, are as follows. In a large size assembly of the invention, which is configured to be installed in any one of the many popular, large-size SUVs, the assembly has dimensions of about 48" width, about 36"depth, about 16" height and each member or panel has a thickness of about 4".

In a relatively smaller size assembly of the invention which is configured to be installed in any one of the many popular relatively smaller sized SUVs, the assembly has dimensions of about 38" width, about 30"depth, about 16" height and each member or panel has a thickness of about 4".

While this invention has been described with respect to various specific examples and embodiments, it is to be understood that the invention is not limited thereto and that it can be variously practiced within the scope of the following claims.

What is claimed is:

1. An animal traveler assembly for use in a vehicle, the assembly comprising:
a compressible base portion having a front side, a substantially opposing rear side, a left side and a right side located between the front side and rear side wherein the base portion includes a core having a first layer made of a first material and a second layer made of a second material that is different from the first material, and a cover layer substantially enclosing the first and second layers.

2. The assembly of claim 1 wherein the first material is a compressible memory foam material.

3. The assembly of claim 2 wherein the second material is material that is relatively less compressible than the first material.

4. The assembly of claim 1 wherein the cover layer comprises a puncture resistant material.

5. The assembly of claim 1 wherein the first layer comprises a memory foam material and the second material comprises a support foam material.

6. An animal traveler assembly for use in a rear space of a sport utility vehicle, the assembly comprising:
a compressible base having a front side, a substantially opposing rear side, a left side and a right side located between the front side and rear side;

the base being sized to fit within a cargo space of a sport utility vehicle and including a foam layer and a substantially puncture resistant covering;

a compressible front member connected to the front side of the base portion said compressible front member being fabricated from a compressible pad;

a compressible rear member including a head rest region for accommodating the head of a dog located on the compressible base connected to the rear side of the base portion and the rear member having a soft top and a thickness of about four inches, a height of about fourteen inches in the headrest region;

a first side member and a second side member removably connectable to the left side and right side respectively;

the front and rear members and the first and second side member being configurable to form a free standing unit which may be removed as a unit from the rear space of the sport utility vehicle and to provide an enclosed space about the base portion with an open top for containment of an animal thereon.

7. The assembly of claim 6 wherein the compressible base comprises an orthopedic memory foam material.

8. The assembly of claim 6 further comprising a plurality of connectors effective to removably secure the front member to the first side member and the second side member when the front member is disposed in an upright position with respect to the compressible base.

9. The assembly of claim 6 wherein the compressible base comprises a memory foam material.

* * * * *